United States Patent [19]

Lockhart, Jr. et al.

[11] 3,987,447
[45] Oct. 19, 1976

[54] MISSILE COMMAND LINK WITH PULSE DELETION COMMAND CODING

[75] Inventors: John C. Lockhart, Jr., Oreland, Pa.; Standish C. Hartman, Flemington, N.J.; Carl F. Mattes, Levittown, Pa.; Bruce R. Meuron, Willow Grove, Pa.

[73] Assignee: The United States of America as represented by the Secretary of the Navy, Washington, D.C.

[22] Filed: June 21, 1965

[21] Appl. No.: 465,805

[52] U.S. Cl. .......................... 343/228; 179/15 AF; 179/15 BS; 343/22 S; 325/38 R; 244/3.14
[51] Int. Cl.² .......................................... H04B 7/00
[58] Field of Search........ 179/15 AP, 15 BS, 15 AF, 179/15 AP; 325/38, 38 R; 343/225, 228; 328/120; 244/3.14

[56] References Cited
UNITED STATES PATENTS

| | | |
|---|---|---|
| 2,946,020 | 7/1960 | Hudson .............................. 328/120 |
| 3,053,478 | 9/1962 | Davenport et al. ............. 343/225 X |
| 3,136,861 | 6/1964 | Mayo .............................. 179/15 AP |
| 3,138,759 | 6/1964 | Thompson ......................... 328/120 |
| 3,237,110 | 2/1966 | Kaye .................................. 328/120 |

Primary Examiner—Howard A. Birmiel
Attorney, Agent, or Firm—G. J. Rubens; Henry Hansen; W. C. Everett

[57] ABSTRACT

A command data link between an aircraft and a missile having a high invulnerability to jamming by providing a communications system in which the missile receiver is normally off and is gated on only during a short time during which a signal is supposed to appear, as determined by the missile synchronizer. Coded information is transmitted to the missile by the absence of pulses in a pulse train so that spurious pulses received by the missile cannot result in undesirable missile commands.

8 Claims, 5 Drawing Figures

MISSILE COMMAND LINK WITH PULSE DELETION COMMAND CODING

The invention described herein may be manufactured and used by or for the Government of the United States of America for governmental purposes without the payment of any royalties thereon or therefor.

The present invention relates to guided missiles and more particularly to a command link for a guided missile having high invulnerability to radio interference.

In the field of radio controlled missiles it has been the general practice to employ a digital form of radio control in which a sequence of pulses having significance is transmitted by the controlling aircraft and received by the missile and decoded thereby to provide control information for the control surfaces of the missile. Such devices have been subject to friendly interference or hostile jamming in which various pulses may be inserted at critical portions of the pulse sequence providing false information to the missile.

The general purpose of this invention is to provide a command link for a missile which provides high invulnerability to jamming, thereby insuring greater control of the missile by the guiding aircraft. To attain this the present invention contemplates a transmitter receiver system in which the receiver is shut off from the reception of pulses except during a narrow gated interval in which the correct pulse is supposed to appear, as determined by a missile synchronizer. Critical information is transmitted to the missile by the absence of pulses in the pulse train at predetermined positions in the code sequence. By these means therefore spurious pulses which do not appear during the narrow gated intervals are not received by the missile at all, and spurious pulses which are received by the missile cannot appear as spurious information but can result at most in the blocking for one cycle of the correction information. In addition, the invention provides a synchronizer which holds an oscillator on the correct pulse repetition rate even when spurious pulses are being received.

Accordingly, it is an object of the present invention to provide a command link for a missile the synchronization of which is not upset by the reception of spurious pulses.

Another object of the invention is to provide a command link for a missile in which the receipt of spurious pulses by the missile does not result in false commands or misguiding of the missile.

A further object of the invention is the provision of a narrow gate generator in a command link for a missile which prevents the receipt of spurious pulses except during a predetermined narrow range determined by the missile receiver synchronizer.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
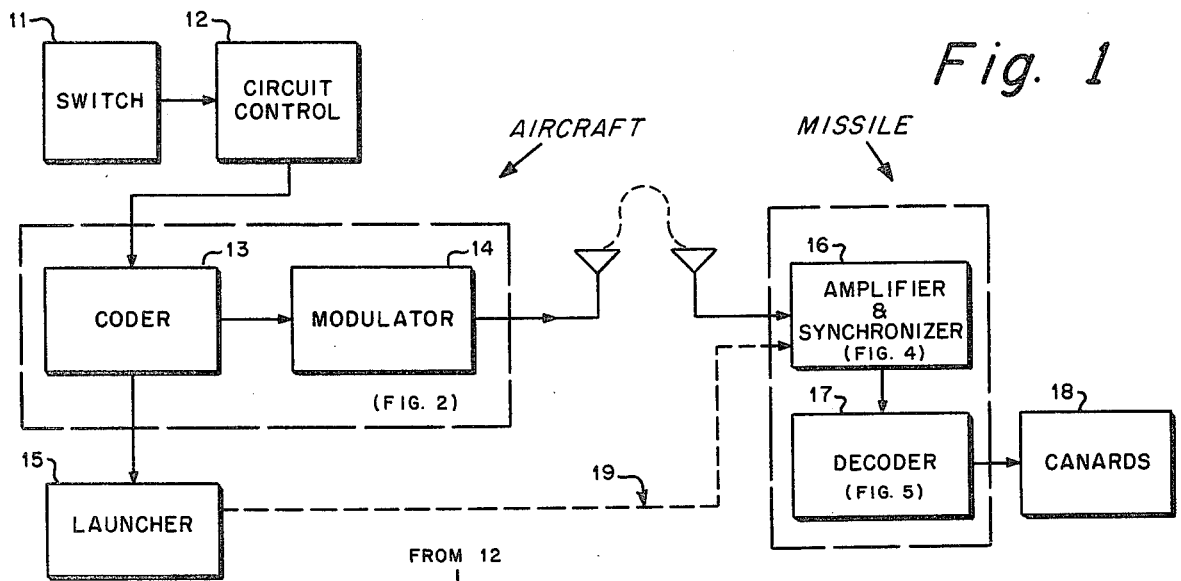
FIG. 1 shows a block schematic diagram of the transmitter-receiver system in an aircraft and missile according to the invention.

In FIG. 1 is shown a switch 11 controlled by the pilot. The operation of switch 11 causes the generation of signals controlling the circuit in a circuit control 12. These signals are supplied to a coder 13 which generates a sequence of digital pulses to a modulator 14 and a launcher 15. In the missile there is shown an amplifier and synchronizer 16 supplying a sequence of signals to a decoder 17 which controls the operation of the canards 18 on the missile. When the missile is still in the aircraft the control signals are provided from the launcher 15 to the amplifier and synchronizer 16 as shown by the dotted line 19. After the missile is launched the sequence of command pulses is broadcast by modulator 14 by way of an antenna to the antenna of the missile as shown.

Figure 2:
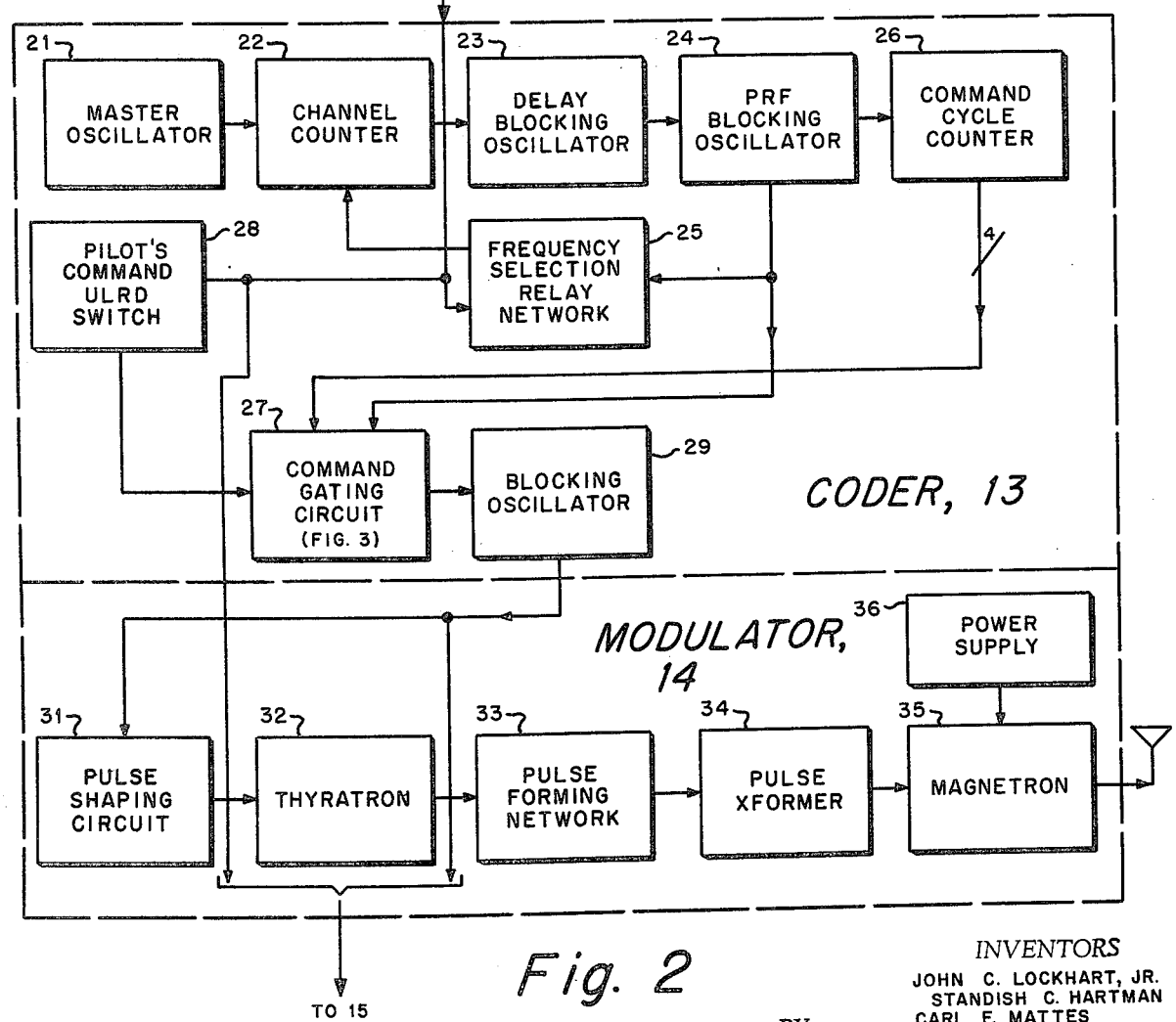
FIG. 2 shows a block schematic diagram of a decoder and modulator in the transmitter in the aircraft shown in FIG. 1.

In FIG. 2 the coder is controlled by a master oscillator 21 supplying pulses to a channel counter 22. Channel counter 22 is a six-stage counter which can provide a count of up to 64, thereby dividing the frequency from the master oscillator by a selectable amount up to 64. In practice the number selected will be somewhere between approximately 35 and 63 for reasons which will appear subsequently. The output of channel counter 22 establishes the pulse repetition frequency which is supplied to a delay blocking oscillator 23 which operates a PRF blocking oscillator 24. The delay blocking oscillator 23 shifts the channel counter feedback pulses to avoid coincidence with the source outputs. The output of PRF blocking oscillator 24 provides a signal to a frequency selection relay network 25. Network 25 receives a frequency selection signal from circuit control 12 and selected by the pilot through switch 11. Network 25 provides then a feedback signal to channel counter 22 to control its selection. By this means then the pilot through switch 11 may select the pulse repetition frequency by which the missile is operated. It will be seen that the pulse repetition frequency in the present system will be somewhere between 1500 pulses per second and 2500 pulses per second. The output of the PRF blocking oscillator 24 is also sent to a command cycle counter 26 comprising four stages and capable of counting from 0 to 15 in binary form. The output of counter 26 and oscillator 24 is fed to a command gating circuit 27, which also receives direction signals from a pilot's command ULRD switch 28 which is also controlled by signals from circuit control 12. These signals are provided by the position of the pilot's control stick as he controls the flight of the missile. The signals into command gating circuit 27 will comprise go signals on Up, Down, Left and Right lines. The output of command gating circuit 27 goes to a blocking oscillator 29 which transmits pulses to modulator 14. The signals sent to launcher 15 are the frequency selection signal from circuit control 12 which goes to network 25, the command signal which causes the missile to be launched, which also comes from switch 11 by way of circuit control 12, and the digital pulse train coming from blocking oscillator 29 which is fed by wire directly to the missile when it is still with the aircraft.

In modulator 14 there is shown a pulse shaping circuit 31 for driving a thyratron 32 which discharges a pulse forming network 33 into a pulse transformer 34. When network 33 is discharged into transformer 34 the secondary of transformer 34 drives a magnetron 35 powered by a power supply 36. Magnetron 35 transmits a high peak power pulse having a duration of approximately one-half microsecond.

Figure 3:
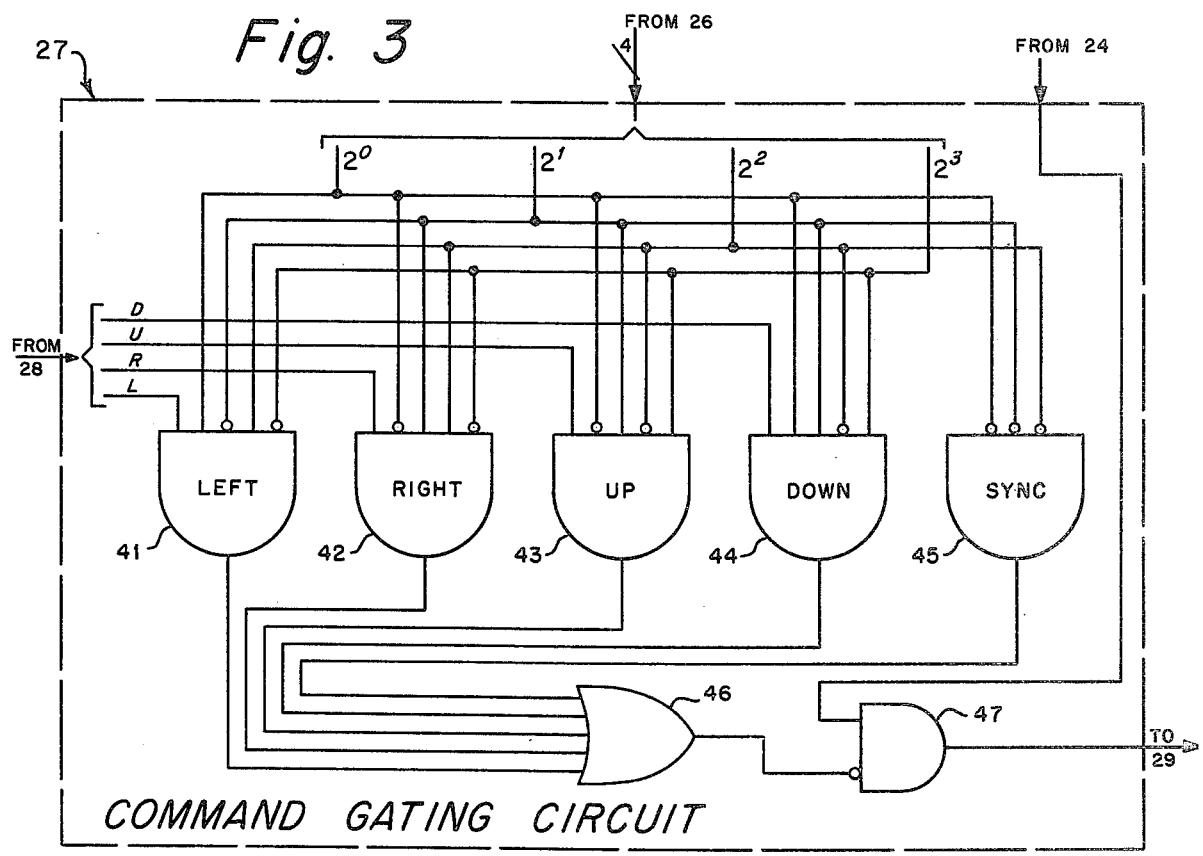
FIG. 3 shows a logic diagram of the command gating circuits in the decoder shown in FIG. 2.

The details of the command gating circuit 27 are shown in FIG. 3. As indicated, the command signals signifying Down, Up, Right or Left come in from the pilot's command switch 28 and are led into a succession of enabling gates 41, 42, 43 and 44, labeled respectively, Left, Right, Up and Down. These gates are enabled by combinations of binary signals from command cycle counter 26 as indicated. The enabling signals from counter 26 are labeled respectively 1, 2, 4 and 8 represented in binary form as $2^0$, $2^1$, $2^2$ and $2^3$. As determined by counter 26 a complete cycle is 16 pulses. The Left go signal is enabled on the fifth pulse, the Right go signal on the sixth pulse, the Up go signal on the tenth pulse, and the Down go signal on the eleventh pulse as indicated at the inputs to gates 41 through 44. There is also a sync gate 45 which as indicated is enabled on every eighth and sixteenth pulse, or when the conditions of stages 1, 2 and 4 are zero. The outputs of gates 41 through 45 are passed through an OR gate 46 to the inhibit point of a pulse gate 47. Pulse gate 47 receives pulses from the PRF blocking oscillator 24, and passes them through to blocking oscillator 29 except when there is a signal issuing out of OR gate 46. The command signals are thereby indicated by the omission of pulses at predetermined points in the pulse train. These signals may be referred to as gaps. Sync gaps are provided at the eighth and sixteenth pulses for timing purposes in a manner shown in connection with the missile synchronizer. The indication of the various commands, Left, Right, Up and Down is done by gaps at predetermined positions between the sync gaps. The Left command is a gap at the fifth pulse, the Right command a gap at the sixth pulse, the Up command a gap at the tenth pulse, and the Down command a gap at the eleventh pulse.

Figure 4:
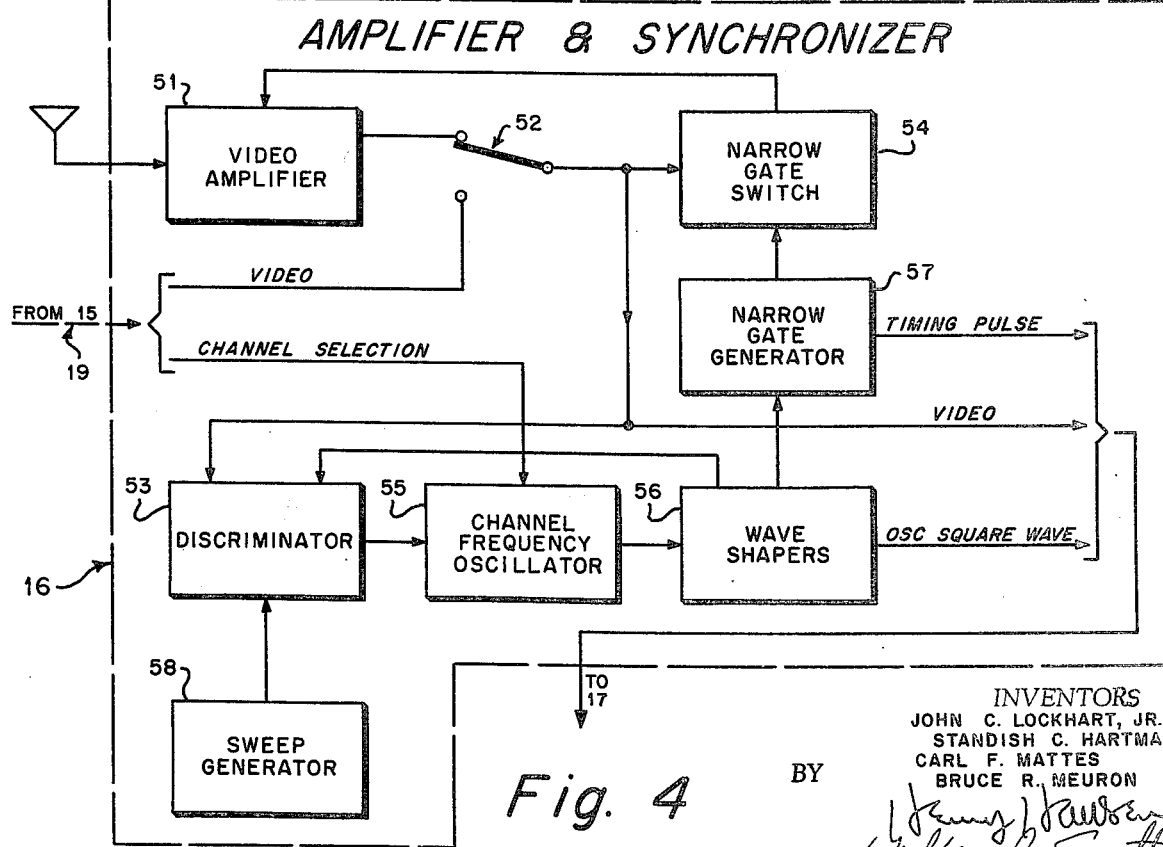
FIG. 4 shows a block schematic diagram of an amplifier and synchronizer in the missile receiver shown in FIG. 1.

In the missile amplifier and synchronizer 16 shown in detail in FIG. 4 there is a video amplifier 51 which receives the transmitted signal through an antenna as shown. This signal is amplified and passed through a switch 52 to a discriminator 53, to a narrow gate switch 54, and to the decoder 17. The synchronizer is controlled by a channel frequency oscillator 55, the frequency of which has been preselected by a channel selection signal through launcher 15 before the missile was launched. The oscillator 55 provides an output oscillation to a wave shaper 56 which produces an output square wave which is high for exactly one-half of the cycle. Wave shaper 56 also sends an output back to discriminator 53 where it is compared with the incoming pulses from video amplifier 51 to provide a control signal for oscillator 55. Wave shaper 56 also sends a signal to narrow gate generator 57 which generates a narrow gate pulse which brackets the expected received pulses with a bracket about 10 microseconds long. This narrow gate is applied to narrow gate switch 54 which turns off video amplifier 51 except during the narrow gate so that video amplifier 51 is protected from spurious pulses not occurring during the anticipated 10 microsecond interval. Narrow gate switch 54 also receives the pulses from video amplifier 51 and is set such that if switch 54 does not receive a pulse from amplifier 51 in one-tenth of a second it opens video amplifier 51 for the entire cycle so that it may resynchronize. The sweep generator 58 is provided to control discriminator 53 to sweep through the expected range of frequencies to cause resynchronization in the event that synchronization is lost as indicated by the loss of pulses into narrow gate switch 54.

Figure 5:
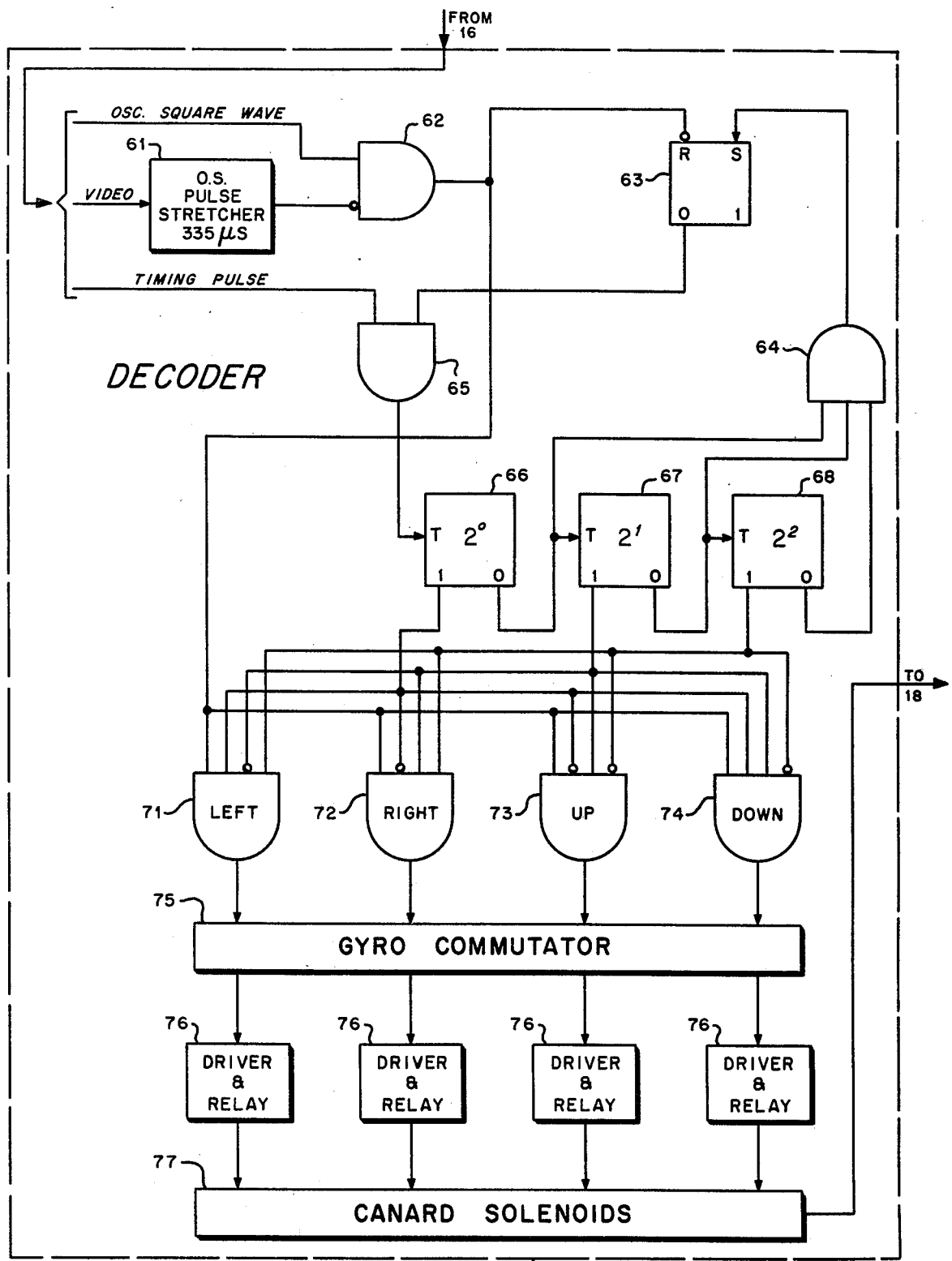
FIG. 5 shows a logic diagram of the decoder in the missile receiver shown in FIG. 1.

In the decoder shown in FIG. 5, three signals come in: the oscillator square wave from wave shaper 56, the received video pulses from video amplifier 51, and the timing pulse generated by narrow gate generator 57. As each video pulse comes in it activates a one-shot pulse stretcher 61. When driven by the incoming video pulses, pulse stretcher 61 issues an output pulse of duration approximately 335 microseconds. This duration is carefully calculated to be longer than the high side of the oscillator square wave from wave shaper 56 for the lowest pulse repetition frequency, but shorter than the time between two pulses from the highest PRF. Therefore, the ratio of highest PRF to lowest cannot be more than 2:1, unless the pulse stretcher 61 is made variable controlled. For this reason the counter 22 in the aircraft selects a divide rate between 33 and 63. The oscillator square wave and the ouput of the one-shot pulse stretcher 61 are fed into an AND gate 62 in which the oscillator square wave activates the AND gate 62 but the output of the pulse stretcher inhibits it. Therefore, there will be an output from gate 62 only if the square wave is high at a time when there is no output from the pulse stretcher 61. The output of AND gate 62 is fed to the reset point of the flip-flop 63 which, as indicated, is reset by the trailing edge of the output from gate 62. Flip-flop 63 is set by the output from an AND gate 64. When flip-flop 63 is reset it enables an AND gate 65 to pass the incoming timing pulses through to a flip-flop 66 which together with flip-flops 67 and 68 form a three-stage counter. Each stage of the counter is triggered to switch positions when the previous counter goes to the reset stage, as is well known in the art of binary counters. Incoming timing pulses are counted on the three-stage counter 66, 67, 68 zero when all three stages are in the zero state, AND gate 64 is enabled to send a set signal to flip-flop 63, which is set by the leading edge of the set signal.

The output pulse from AND gate 62 also goes to a set of command gates, Left gate 71, Right gate 72, Up gate 73, and Down gate 74. Each of these gates is enabled by predetermined timing signals from stages 66, 67, 68 of the counter. As indicated, the timing signal for Left gate 71 is binary 5, the timing signal for the Right gate 72 is binary 6, the timing signal for Up gate 73 is binary 2, and the timing signal for Down gate 74 is binary 3. The binary 8 signal which was a portion of the transmitter command counter 26 is omitted in the receiver for a reason which will be explained subsequently. If the pulse from AND gate 62 coincides with the correct timing signals from the three-stage counters 66, 67, 68 in one of the gates 71 through 74 the appropriate command is set to a gyro commutator 75. Since the missile rolls in flight it is necessary to determine at any point which of the canards is in the Left, Right, Up or Down positions. This is done by means of the gyro commutator which contains a gyroscope referenced to an inertial reference system. The gyro commutator receives a command from one of gates 71 through 74 and decides which of the canards is in the appropriate position to receive that command. The gyro commutator 75 need not be described specifically, as it is a common device well known in the art. Four driver and relays 76 are provided to be actuated by commands from the gyro commutator 75 to operate canard solenoids 77 which control the position of the canards on the missile. The driver and relays 76 are constructed so as to be actuated by a pulse of short duration once per cycle. The output pulses from gates 71 through 74 may be anywhere from approximately 165 microseconds to 330 microseconds or so. If one of these appears at a driver and relay 76 each cycle, or once in several cycles, it is sufficient to operate that driver and relay 76.

The operation of the command link is as follows: The pilot selects at switch 11 a pulse repetition frequency, which is inserted into the frequency selection relay network 25 and through launcher 15 to the channel frequency oscillator 55. So long as the missile is still attached to the aircraft switch 52 is in its lower position so that the video signal which passes from blocking oscillator 29 through launcher 15 comes in directly on the video line 19 through switch 52 to narrow gate switch 54, discriminator 53, and modulator 14. By direction of discriminator 53, channel frequency oscillator 55 will then be rotated in phase to be synchronized with the incoming video pulses. When pulses begin to come into narrow gate switch 54 the narrow gate will be generated by generator 57 and the missile would be synchronized to receive pulses either through launcher 15 or by radio transmission.

However, before the missile is released the generated sequence from blocking oscillator 29 is lined up with the counter 66, 67, 68 in the missile. The pulse sequence at the beginning consists of seven pulses and a gap, and seven more pulses and another gap. As the oscillator square wave comes into gate 62, timing pulses come into gate 65. If flip-flop 63 happens to be reset to start with, the timing pulses will pass through gate 65 to the trigger of flip-flop 66 and they will be counted on counter 66, 67, 68. When the count of eight, denoted by all zeroes, is reached on counter 66, 67, 68 there will be an output through gate 64. This will cause flip-flop 63 to be set. If there is a pulse in this period on the video the one-shot pulse stretcher 61 will inhibit gate 62 for the entire duration of the oscillator square wave and no signal will be present to reset flip-flop 63. Gate 65 will therefore be inhibited, holding counter 66, 67, 68 in an eight condition. It will be held in this condition until a gap appears in the video. At this point gate 62 will be enabled to pass the oscillator square wave through gate 62 to the reset point of flip-flop 63. The trailing edge of this square wave will reset the flip-flop and gate 65 will again be enabled. Thereafter timing pulses will continue to be counted. Each time the counter 66, 67, 68 reaches the eight condition a set pulse will be sent into flip-flop 63. However, flip-flop 63 will immediately be reset by the trailing edge of the oscillator square wave through gate 62, provided there is a sync gap in the pulse sequence at that point. By this means the counter 66, 67, 68 will be lined up correctly with the pulse code sequence to begin with.

When the missile is launched switch 52 is switched from the lower position to the upper position as shown in FIG. 4. Thereafter, it will receive pulses at its antenna and put them out by video amplifier 51. Channel frequency oscillator 55 is sufficiently stable that it will hold the synchronizer of the missile on the same frequency long enough for video amplifier 51 to begin to issue the transmitted code sequence to the synchronizer and decoder. Thereafter the pilot will control the flight of the missile with Left, Right, Up or Down signals on his control stick contained in switch 11. The position of the control stick will be translated into these commands or a combination of two of them in switch 28. These go signals come into gates 41 through 44 and cause gaps to appear in the pulse code sequence at the appropriate position in the sixteen-pulse cycle. It is important that each of the commands should appear as a gap in only one of the two eight-pulse halves of the sixteen-pulse cycle, for the reason that if the missile ever gets out of synchronization either through spurious pulses or through loss of signal it might accidentally line up the counter 66, 67, 68 with one of the command gaps rather than one of the sync gaps. However, if it does line up on one of the command gaps a pulse will appear in the sequence at the same position in the next eight-pulse half cycle, and the appearance of this pulse in the same position will cause flip-flop 63 to freeze on set until the sequence has passed to the following gap. It will continue to freeze and look for the next gap until it has lined up with one of the sync gaps. It is equally important that the the missile counter count only up to eight rather than sixteen because otherwise the counter 66, 67, 68 might line up with a sync gap in the middle of the cycle instead of at the beginning of the cycle. In the invention the counter 66, 67, 68 can line up with any sync gap and because the pulse sequence is treated as two alternate cycles of eight pulses rather than one sixteen-pulse cycle the decoder is not only correctly lined up but is lined up correctly in one-half the time. The enable code for the Up gate 73 is binary 2, which is binary 10 minus the binary 8 which has been eliminated in the decoder. The enable code for Down gate 74 is binary 3 which is binary 11 minus the binary 8. Therefore, Up gate 73 and Down gate 74 will recognize the Up and Down commands respectively when they are generated in every other half cycle. The driver and relay 76 will convert this into the appropriate command.

The circuit of the present invention provides extremely high protection in the missile against both friendly interference and hostile jamming in three separate ways. First, the narrow gating of the video amplifier 51 by generator 57 prevents the reception of any pulses except during the narrow interval in which the transmitted pulse is expected, as dictated by oscillator 55. Since the period between one pulse and the next is from 350 microseconds to approximately 660 microseconds and the width of the narrow gate generated by generator 57 is approximately 10 to 12 microseconds it will be seen that approximately 98 percent of all area noise is blocked from the missile receiving system. Second, if for any reason the signal is lost for long enough to cause the synchronizer to search again it can generally be brought back into synchronization within a small fraction of a second after the transmitted signal is restored. Third, if hostile jamming is able to insert spurious pulses into the pulse train, and if these are successful in breaking into the narrow range generated by generator 57 they have no effect at all in the positions of the code sequence where a pulse is scheduled anyway, and if a spurious pulse comes in where there is supposed to be a gap in the code sequence the only effect of it can be either to block a command or to cause the timing counter 66, 67, 68 to freeze for one code cycle. Within the duration of one code cycle the decoder should be realigned with the transmitted sequence and during this time synchronization in the synchronizer is not lost because the pulse frequency determined by oscillator 55 has not been disturbed. In any event reception of spurious pulses cannot result in spurious commands to the missile.

Because of the narrow gating effect it is also possible for a number of aircraft in the zone area to launch missiles simultaneously without mutual interference.

Obviously many modifications and variations of the present invention are possible in the light of the above teachings. It is therefore to be understood that within the scope of the appended claims the invention may be practiced otherwise than as specifically described.

We claim:

1. A command link between a transmitter and a receiver, comprising:
   means for transmitting a sequence of pulses at regular predetermined intervals, said means for transmitting including an oscillator issuing pulses at regular predetemined intervals and a modulator transmitting pulses when activated by pulses from said modulator;
   means for generating command gaps in said sequence of pulses at predetermined positions as a function of commands imposed on said transmitting means, said means for generating gaps including:
      a counter counting pulses from said oscillator, a predetermined number of said pulses comprising a cycle;
      means in response to a predetermined condition of said counter to inhibit pulses from said oscillator from reaching said modulator when a command signal is inserted, there being a separate predetermined condition of said counter for each command signal, said means to inhibit pulses when a a command signal is inserted comprising an AND gate for each command signal having as inputs binary inputs corresponding to a predetermined condition of said counter and an input signal which is on when said command signal is inserted, the output of said AND gate inhibiting pulses from said modulator;
      means in response to a predetermined condition of said counter to inhibit pulses from said oscillator from reaching said modulator to form sync gaps, said sync gaps occurring occurring twice in each cycle equally spaced, and the predetermined condition for each command signal occuring once in each cycle, said means to inhibit comprising an AND gate having as inputs binary inputs from all stages of said counter except the last, the output of said AND gate inhibiting pulses from said modulator;
   means for receiving said sequence of pulses; and
   means for translating said gaps into said commands.

2. A command link as recited in claim 1 wherein said means for receiving said transmitted sequence of pulses comprises:
   another oscillator issuing pulses at the rate of said transmitted pulses; and
   a discriminator comparing said other oscillator pulses with said transmitted pulses to hold said other oscillator pulses in phase with said transmitted pulses.

3. A command link between a transmitter and a receiver, comprising:
   means for transmitting a sequence of pulses at regular predetermined intervals;
   means for generating command gaps in said sequence of pulses at predetermined positions as a function of commands imposed on said transmitting means;
   means for receiving said sequence of pulses; said receiving means including;
      a video amplifier receiving said transmitted pulses;
      an oscillator issuing pulses at a rate of said transmitted pulses;
      a discriminator comparing said oscillator pulses with said transmitted pulses to hold said oscillator pulses in phase with said transmitted pulses;
      a gate generator actuated by said oscillator pulses and generating a gate extending a predetermined interval on each side of the expected transmitted pulses;
      a gate switch actuated by said gate to turn said amplifier off except during said gate interval; and
   means for translating said gaps in said sequence of pulses into commands.

4. A command link between a transmitter and a receiver comprising:
   means for transmitting a sequence of pulses at regular predetermined intervals;
   means for generating command gaps in said sequence of pulses at predetermined positions as a function of commands imposed on said transmitting means;
   means to generate sync gaps in said sequence of pulses, the position of said command gaps with respect to said sync gaps determining the commands;
   means for receiving said sequence of pulses;
   means for translating said gaps in said sequence of received pulses into said commands, said means for translating including:
      a counter counting said transmitted pulses;
      means for inhibiting said counter upon the occurrence of a predetermined condition of said counter;
      means for releasing said counter for counting at the occurrence of a gap in said sequence a predetermined number of pulses comprising a cycle, the length of said counter being one-half of said cycle,
      said sync gaps being transmitted twice in each cycle, said command gaps when transmitted being transmitted once in each cycle;
      means at a predetermined portion of a cycle to determine if a gap is present and to issue an output pulse thereon; and
   means to translate said output pulse into a predetermined command.

5. A command link as recited in claim 4 wherein said means for inhibiting said counter comprises:
   a first AND gate blocking passage of pulses to said counter when disabled; and
   a bistable storage element disabling said first AND gate when set, said element being set by said predetermined condition of said counter;
   and said means for releasing said counter comprises:
   a second AND gate enabled by a gap, said gate when enabled issuing a reset pulse the trailing edge of which resets said storage element to enable said first AND gate.

6. A command link as recited in claim 5, wherein said means to determine if a gap is present comprises:
   a plurality of AND gates each responsive to a different predetermined condition of said counter, and each enabled by a reset pulse from said second AND gate.

7. A command link between a transmitter and a receiver comprising:

means for generating a pulse sequence having command gaps and sync gaps at predetermined intervals in said sequence, the position of said command gaps with respect to said sync gaps determining the commands, said means including:

an oscillator issuing pulses at regular predetermined intervals;

a first counter counting pulses from said oscillator, a predetermined number of said pulses comprising a cycle;

means to select the number of pulses which comprise a cycle of said first counter;

a second counter counting a predetermined number of said cycles from said first counter;

a command gating circuit connected to receive the outputs of first counter and responsive to said commands for providing said command gaps in said pulse sequence, there being a separate predetermined condition of said first counter for each command, said circuit also responsive to the outputs of said second counter for providing said sync gaps in said pulse sequence, said sync gaps occurring twice in each cycle equally spaced, and the predetermined condition for each command occurring once in each cycle; and means remote from said generating means for decoding said pulse sequence into a command.

8. A command link a recited in claim 7 wherein said means for decoding said pulse sequence into commands comprises:

a third counter counting said pulse sequence;

means for inhibiting said third counter upon the occurrence of a predetermined condition of said third counter;

means for releasing said third counter for counting at the occurrence of a gap in said sequence;

means at a predetermined portion of a cycle to determined if a gap is present and to issue an output pulse thereon; and means to translate said output pulse into a predetermined command.

* * * * *